United States Patent
Tamura et al.

(10) Patent No.: US 7,048,328 B2
(45) Date of Patent: May 23, 2006

(54) PANEL SEALING STRUCTURE

(75) Inventors: Michio Tamura, Saitama (JP);
Masaharu Ohnishi, Saitama (JP);
Tatsuya Ohara, Saitama (JP); Tatsuaki Uehara, Tochigi (JP); Yoshitaka Higuchi, Tochigi (JP)

(73) Assignees: Yachiyo Kogyo Kabushiki Kaisha, Saitama (JP); Honda Giken Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/973,457

(22) Filed: Oct. 27, 2004

(65) Prior Publication Data
US 2005/0081451 A1 Apr. 21, 2005

Related U.S. Application Data

(63) Continuation of application No. 10/247,823, filed on Sep. 20, 2002.

(30) Foreign Application Priority Data

Sep. 21, 2001 (JP) ............................ P.2001-288003

(51) Int. Cl.
*B60J 10/12* (2006.01)
(52) U.S. Cl. ................................. 296/216.09
(58) Field of Classification Search ...............
296/216.06–216.09
See application file for complete search history.

(56) References Cited

U.S. PATENT DOCUMENTS

| 5,516,186 | A | * | 5/1996 | Scherf et al. .......... 296/216.09 |
| 5,553,913 | A | | 9/1996 | Nabuurs |
| 6,283,540 | B1 | | 9/2001 | Siebelink, Jr. |
| 6,491,341 | B1 | | 12/2002 | Grimm et al. |
| 6,517,150 | B1 | * | 2/2003 | De Gaillard et al. ... 296/216.06 |

FOREIGN PATENT DOCUMENTS

| DE | 19630177 | * | 1/1998 |
| DE | 19832379 | * | 1/2000 |
| JP | 6-191280 | | 7/1994 |
| JP | 8-13040 | | 5/1996 |

* cited by examiner

*Primary Examiner*—Dennis H. Pedder
(74) *Attorney, Agent, or Firm*—Sughrue Mion, PLLC

(57) ABSTRACT

The present invention provides a panel seal structure having a seal mounted around the outer circumferential edge of a panel body, such as glass panel, covering an opening formed in a vehicle body. An upper face of the seal is set to be substantially flush with an upper face of the panel body. A lip to be contactable with an edge of the panel body is formed along the upper face of the seal, and the edge of the lip is deformed downward upon contact with the edge of the panel body. Thereby, since the edge of the lip is deformed downward, a dimensional error of the panel body is accommodated for, and the continuity between the upper face of the seal and the upper face of the panel body is enhanced.

9 Claims, 1 Drawing Sheet

PANEL SEALING STRUCTURE

This application is a CON of Ser. No. 10/247,823 Sep. 20 2002.

BACKGROUND OF THE INVENTION

The present invention relates to a panel seal structure including a seal mounted around a circumferential edge of a panel for use in covering an opening formed in a vehicle body.

Sunroofs in vehicles are well known and typically include a stationary roof panel and a movable panel. The stationary roof panel of the vehicle body is formed with an opening. The movable panel has a plate glass or a steel plate that is provided slidably in the longitudinal direction of the vehicle to open or close the opening. This type of sunroof also has a seal member for preventing rainwater from entering into the vehicle by closely placing the seal member in contact with an inner circumferential edge of the opening. In one related art application, the seal member is mounted around an outer circumferential edge of the panel body (refer to JP-A-8-113040).

In many applications, however, it is desirable to use a so-called flush surface structure in which the upper surface of the seal member, the upper surface of the movable panel, and the upper surface of the stationary roof panel of the vehicle body are flush and continuous with one another. This flush surface structure is used to suppress wind noise when the movable panel is in a closed position, and also has the added benefit of making the vehicle look more attractive.

To realize this flush surface structure, a structure has been already employed for some commercially available vehicles in which a synthetic resin frame having the junctions of the seal member is injection molded around the outer circumferential edge of the panel body (refer to JP-A-6-191280).

With this related art structure, however, the synthetic resin frame must be outsert molded onto the panel body. Therefore, when using this method, there is a very narrow range for absorbing manufacturing errors of the panel body. As such, because of the necessity of precision manufacturing of the panel body, the manufacturing process becomes complex and manufacturing costs are increased.

SUMMARY OF THE INVENTION

The present invention solves the aforementioned problems associated with the related art, and it is an object of the invention to provide an improved flush surface panel sealing structure that does not require as precise of manufacturing process for the panel body as in the related art.

In order to accomplish the above object, the present invention provides a panel seal structure having a seal 12 mounted around the outer circumferential edge of a panel body (glass panel 5 in an embodiment) covering an opening 2 formed in a vehicle body. The panel seal structure of the present invention is characterized in that an upper face of the seal 12 is set to be substantially flush with an upper face of the panel body, a lip 20 to be contactable with an edge of the panel body is formed along the upper face of the seal, and the edge of the lip is deformed downward upon contact with the edge of the panel body.

With this panel seal structure, the edge of the lip is deformed downward to absorb a dimensional error of the panel body, and enhance the continuity between the upper face of the seal and the upper face of the panel body.

DETAILED DESCRIPTION OF THE PREFERRED EMBODIMENTS

The preferred embodiments of the present invention will be described below with reference to the accompanying drawings.

Figure 1:
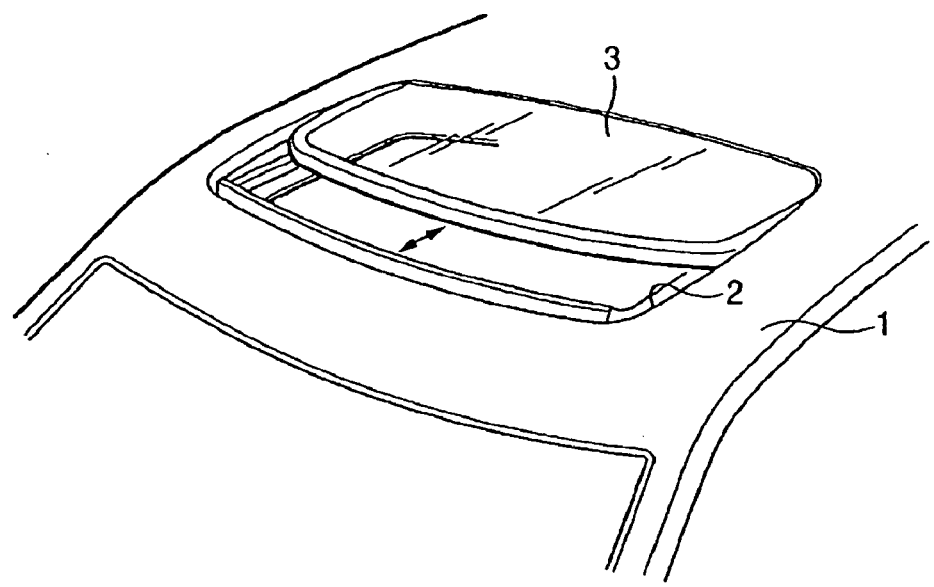
FIG. 1 is a perspective view of a vehicle roof having a sunroof to which the panel sealing structure of the present invention is applied.

FIG. 1 is a perspective view of a vehicle roof having a sunroof to which the panel sealing structure of the present invention is applied. As shown in FIG. 1, a stationary roof 1 of the vehicle is formed with a slightly laterally elongated rectangular opening 2. The opening 2 can be opened or closed by a movable panel 3 shaped to correspond with the inner circumferential contour of the opening 2.

Figure 2:
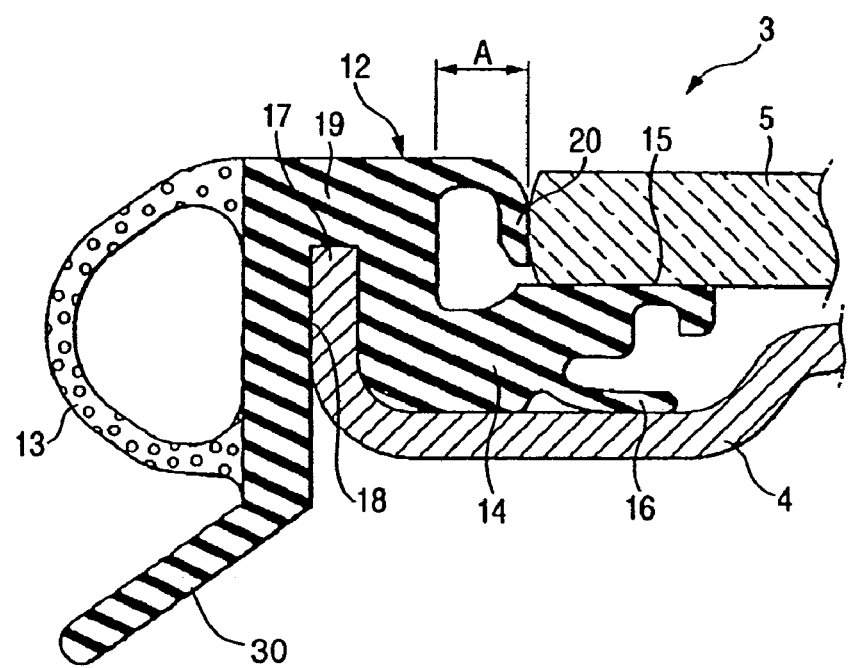
FIG. 2 is an enlarged cross-sectional view of a seal member according to the invention.

As shown in FIG. 2, the movable panel 3 is composed of a glass holder 4 and a glass panel 5 as a panel body fixed on the glass holder 4 by, for example, adhesives. The glass holder 4 is formed from a metal plate, and connected to a slide shoe that slides along a guide rail (not shown) provided on the side of the stationary roof and a cam or link mechanism for effecting a tilt operation or slide operation.

A seal member 12 is mounted around the outer circumferential edge of the glass panel 5 in order to prevent rainwater from entering into a vehicle compartment while the seal member is in close contact with the inner circumferential edge of the opening 2; or in more common terms, when the sunroof is closed. The seal member 12 has an opening contact portion 13 that is made of a soft material configured in a hollow shape so as to be relatively easily collapsible. The seal member 12 also has a glass panel connecting portion 14 that is made of a hard material and that is solid-shaped. The seal member 12 may be formed, for example, by extrusion molding the synthetic resin material into a long member having a uniform cross section.

The glass panel connecting portion 14 comprises a shelf portion 15, a camber absorption lip 16, a glass holder connecting portion 19, a panel edge contact lip 20, and a guide lip 30. The shelf portion 15 makes contact with a lower face of the glass panel 5. The camber absorption lip 16 is formed on a lower face of the shelf portion 15 to follow the curvature of the glass holder 4 by resiliently contacting with an upper face of the glass holder 4 curved in accordance with the curvature of the outer face of the stationary roof 1. The glass holder connecting portion 19 is set up to be substantially flush with the upper face of the glass panel 5 laid on the upper face of the shelf portion 15. The glass holder connecting portion 19 has a groove 18 for carrying a rising edge 17 formed on the outer circumferential edge of the glass holder 4. The panel edge contact lip 20 extends from the upper face of the glass holder connecting portion 19. The guide lip 30 guides water, for example, when it rains, away from the vehicle opening.

Between the glass holder connecting portion 19 and the outer circumferential edge of the glass panel 5, a gap A is appropriately provided to allow for trouble-free mounting of the seal member 12, even if there is an error in the outer dimension of the glass panel 5. To explain, the panel edge contact lip 20, upon making contact with the outer circumferential edge of the glass panel 5, is deformed downwards to enter its edge into the gap A. With the amount of deflection at this time, the panel edge contact lip 20 can accommodate for the error in the outer dimension of the glass panel 5. That is, when the error of the glass panel 5 is in the plus direction, the panel edge contact lip 20 is flexed downwards to increase the amount of the edge entering into the gap A. In contrast, when the error of the glass panel 5 is in the minus direction, the panel edge contact lip 20 tends to extend to decrease the amount of the edge entering into the gap A.

As described above, the edge of the lip is deformed downward upon contact with the edge of the panel body to absorb a dimensional error of the panel body, and enhance the continuity between the upper face of the seal and the upper face of the panel body. Accordingly, a flush surface structure can be realized without greatly changing the related art seal structure. As a result, the appearance of the vehicle is enhanced and wind noise is reduced, without increasing manufacturing complexity or costs, or degrading the waterproof performance of the flush surface structure.

The present invention is not limited to the specific above-described embodiments. It is contemplated that numerous modifications may be made to the present invention without departing from the spirit and scope of the invention as defined in the claims. For example, while the sealing structure is described for use in a sunroof application of a vehicle, it maybe employed in other applications where openings in structure are required to be sealed and water or air tight.

What is claim is:

1. A panel sealing structure comprising:
   a panel body covering an opening formed in a structure; and
   a seal mounted around an outer circumferential edge of the panel body, the seal including:
   an upper face set to be substantially flush with an upper face of the panel body; and
   a deformation lip formed along the upper face of the seal to be contactable with an edge of the panel body, said deformation lip operable to deform downward upon contact with the edge of the panel body;
   a shelf portion operable to support the panel body; and
   a camber absorption lip formed below said shelf portion, wherein when said deformable lip is brought in contact with the edge of the panel body, the deformable lip is deformed downward and a tip end of the deformation lip is inserted within a gap that is located laterally beyond an outermost portion of the edge of the panel body.

2. The panel sealing structure according to claim 1, wherein the panel body is a glass panel.

3. The panel sealing structure according to claim 1, wherein the structure is a vehicle body.

4. The panel sealing structure according to claim 1, wherein the seal further includes a panel connecting portion, at least a portion of the panel connecting portion disposed between a lower face of the panel body and a panel holder.

5. The panel sealing structure according to claim 1, wherein shelf portion contacts with a lower face of the panel body.

6. A panel sealing structure comprising:
   a panel body covering an opening formed in a structure;
   a seal mounted around an outer circumferential edge of the panel body, the seal including:
   a deformable portion formed along an upper face of the seal to be contactable with the panel body and deformed downward upon contact with the panel body;
   an opening contact portion having a hollow shape, the opening contact portion being formed of a collapsible material different form a material forming a remainder of the seal,
   wherein when said deformable portion is brought in contact with the edge of the panel body, the deformable portion is deformed downward and a tip end of the deformation portion is inserted within a gap that is located laterally beyond an outermost portion of the edge of the panel body,
   a shelf portion operable to support the panel body; and
   a camber absorption lip formed below said shelf portion, wherein a gap is formed between said shelf portion and said camber absorption lip.

7. A panel sealing structure comprising:
   a panel body covering an opening formed in a structure;
   a seal mounted around an outer circumferential edge of the panel body, the seal including:
   a deformable portion formed along an upper face of the seal to be contactable with the panel body and deformed downward upon contact with the panel body;
   a panel connecting portion including a guide lip operable to guide water away from the opening;
   a shelf portion operable to support the panel body; and
   a camber lip forming a gap with said shelf portion.

8. A panel sealing structure comprising:
   a panel body covering an opening formed in a structure;
   a seal mounted around an outer circumferential edge of the panel body, the seal including:
   a deformable portion formed along an upper face of the seal to be contactable with the panel body and deformed downward upon contact with the panel body;
   an opening contact portion having a hollow shape, the opening contact portion being formed of a collapsible material different from a material forming a remainder of the seal,
   a shelf portion operable to support the panel body; and
   a camber absorption lip formed below said shelf portion, wherein a gap is formed between said shelf portion and said camber absorption lip.

9. A panel sealing structure comprising:
   a panel body covering an opening formed in a structure;
   a seal mounted around an outer circumferential edge of the panel body, the seal including:
   a deformable lip formed along an upper face of the seal to be contactable with the panel body and deformed downward upon contact with the panel body;
   an opening contact portion having a hollow shape, the opening contact portion being formed of a collapsible material different from a material forming a remainder of the seal;
   a shelf lip operable to support the panel body; and
   a camber lip forming a gap with said shelf lip,
   wherein when said deformable lip is brought in contact with the edge of the panel body, the deformable lip is deformed downward and a tip end of the deformable lip is inserted within a gap that is located laterally beyond an outermost portion of the edge of the panel body;
   the remainder of the seal comprises a panel connecting portion formed of a material having a higher hardness property than the collapsible material forming the opening contact portion,
   the camber lip is provided under the shelf lip so as to define a gap therebetween, and
   a shape of the camber lip follows a curved surface of a glass holder.

* * * * *